US006795612B2

United States Patent
Jang et al.

(10) Patent No.: US 6,795,612 B2
(45) Date of Patent: Sep. 21, 2004

(54) DEVICE AND METHOD FOR MEASURING ANGLE OF SLANT SURFACE OF AN OPTICAL COMPONENT

(75) Inventors: Win-Yann Jang, Hsinchu (TW); His-Hsun Tsai, Hsinchu (TW)

(73) Assignee: U-Conn Technology Inc., Hsinchu (TW)

( * ) Notice: Subject to any disclaimer, the term of this patent is extended or adjusted under 35 U.S.C. 154(b) by 325 days.

(21) Appl. No.: 10/104,206

(22) Filed: Mar. 22, 2002

(65) Prior Publication Data

US 2002/0181864 A1 Dec. 5, 2002

(30) Foreign Application Priority Data

May 10, 2001 (TW) ........................................ 90111159 A (51) Int. Cl.[7] ............................................... G02B 6/36
(52) U.S. Cl. ............................. 385/34; 385/52; 385/31; 385/79; 385/72; 356/138; 356/140; 356/141
(58) Field of Search ............................... 385/33–34, 31, 385/78–79, 72, 85, 22, 52; 356/138, 140, 141, 144, 614–615, 622

(56) References Cited

U.S. PATENT DOCUMENTS

| 5,809,193 | A | * | 9/1998 | Takahashi | 385/79 |
|---|---|---|---|---|---|
| 5,889,904 | A | * | 3/1999 | Pan et al. | 385/24 |
| 6,142,678 | A | * | 11/2000 | Cheng | 385/79 |
| 6,168,319 | B1 | * | 1/2001 | Francis | 385/79 |
| 6,181,846 | B1 | * | 1/2001 | Pan | 385/18 |
| 6,280,099 | B1 | * | 8/2001 | Wu | 385/73 |

* cited by examiner

Primary Examiner—Nimeshkumar D. Patel
Assistant Examiner—Dalei Dong
(74) Attorney, Agent, or Firm—Pro-Techtor International (57) ABSTRACT

The invention is a device for measuring angle of slant surface of an optical component and a method used therein. The slant surface of the optical component faces exactly toward the slant surface of a standard GRIN Lens and the optical component is spaced from the standard GRIN Lens by a fixed distance. Laser beams are irradiated into the vertical surface of the standard GRIN Lens and then generate two oval projections on a screen by reflection off the slant surface of the standard GRIN Lens and the slant surface of the optical component, respectively. Therefore, the angle of the slant surface of the optical component can be obtained according to the specification of the standard GRIN Lens and the dimensions of the two oval projections.

5 Claims, 6 Drawing Sheets

DEVICE AND METHOD FOR MEASURING ANGLE OF SLANT SURFACE OF AN OPTICAL COMPONENT

BACKGROUND OF THE INVENTION

1. Field of the Invention

The present invention relates to a method and a device for measuring the angle of the slant surface of an optical component.

2. Description of the Related Art

In an optical device having slant connecting end surfaces, it is required to accurately connect and adjust the connecting end surfaces so as to prevent rotational angle dephasing of the slant end surfaces or misaligned optical axes.

Generally speaking, fibers are joined together by welding or connectors. The fiber has a limited numerical aperture so that a laser beam has a fixed range of diffusion angle after it comes out of the fiber. To avoid the diffusion of the laser beam, a fiber collimator plays an important role in the fiber optic transmission. The fiber collimator can guide the laser beams into the fiber and convert the laser beams to parallel laser beams through a GRIN Lens (Graded INdex lens).

Figure 1:
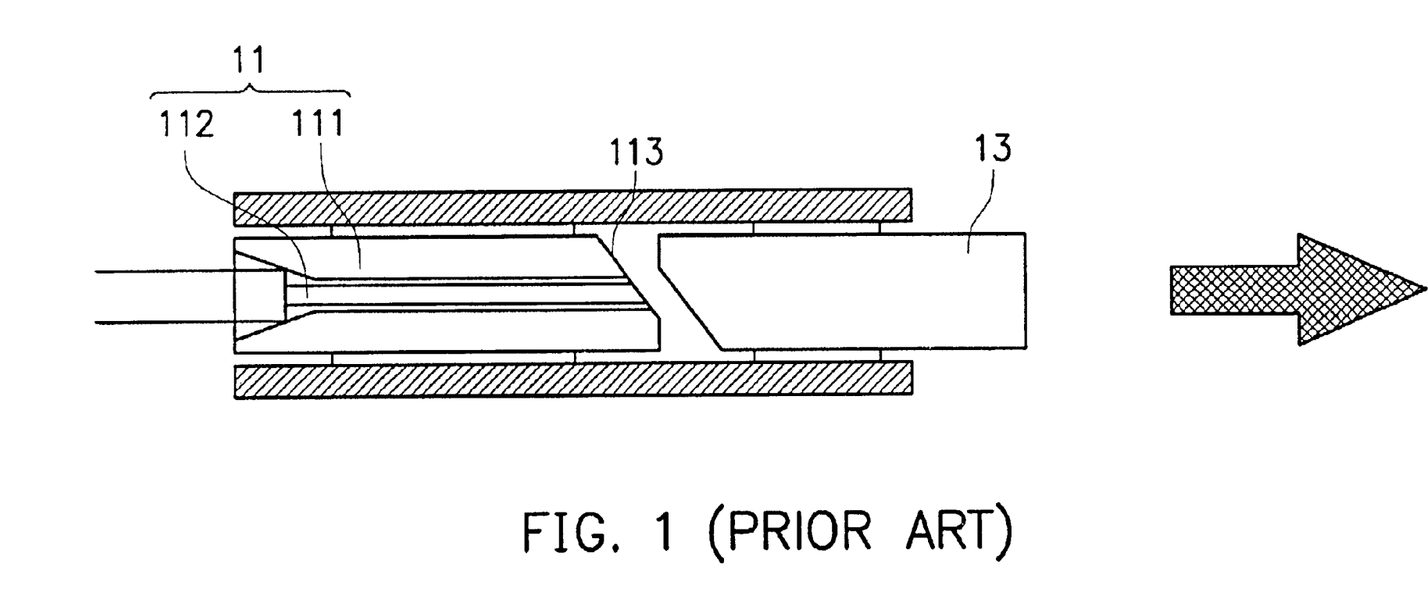
FIG. 1 shows a typical fiber collimator.

To decrease reflection of the laser beams in the fiber, the U.S. Pat. No. 5,809,193 uses a number of ferrules joined together, wherein the ferrules have a slant surface. According to the law of reflection, when the laser beams are in the interface of the slant surfaces of two ferrules, the amount of reflecting back along the original irradiation routes of the laser beams is decreased. The ferrule of the fiber thread in the fiber collimator also has an end surface with a slant surface. A fiber collimator, as illustrated in FIG. 1, comprises a GRIN Lens in conjunction with a ferrule assembly comprising an optical fiber. A fiber collimator can enormously decrease the amount of reflection of the laser beams. In the process of fiber assembly, the ferrule is formed with a certain inclined angle by grinding. The accuracy of the inclined angle of the slant surface of the ferrule influences the exit angle of the laser beams of the fiber collimator. In order to maintain the exit angle of the laser beams of the fiber collimator within a fixed range of tolerance, the angle of the slant surface of the ferrule must be maintained within a fixed tolerance. Thus, it is important to obtain the angle of the slant surface of the ferrule by using an accurate measuring method while manufacturing the fiber collimator.

SUMMARY OF THE INVENTION

An object of the present invention is to provide a device and a method to measure the angle of the slant surface of the ferrule or other optical components.

In the invention, the slant surface of the ferrule faces exactly toward the slant surface of the GRIN Lens, and the ferrule is spaced from the standard component by a predefined distance. Then, laser beams are input into the vertical surface of the standard component such that two oval projections are created on a screen by reflection of the slant surface of the standard component and the slant surface of the ferrule, respectively. As a result, the angle of the slant surface of the ferrule is obtained on the basis of the specification of the standard component and the dimensions of the two oval projections.

A detailed description will be given by the following embodiments with reference to the accompanied drawings.

DETAILED DESCRIPTION OF THE PREFERRED EMBODIMENT

FIG. 1 shows a typical fiber collimator which comprises of a ferrule assembly 11 and a GRIN Lens 13. The ferrule assembly 11 comprises a ferrule 111 and an optical fiber 112. Noticeably, the ferrule 111 has a slant surface 113 ground with an inclined angle.

Figure 2:
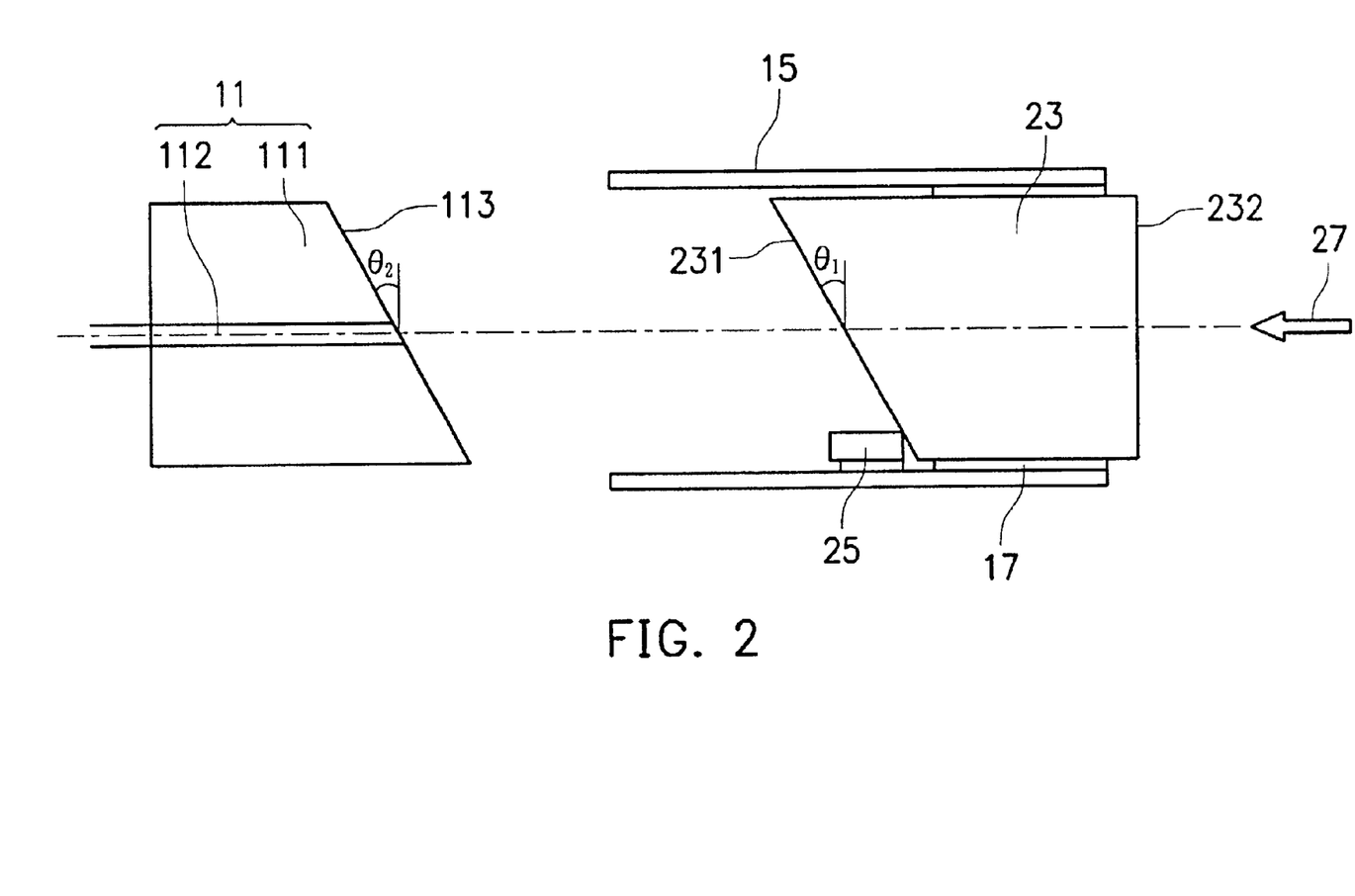
FIG. 2 shows a standard key placed in the fiber collimator.
Figure 3A:
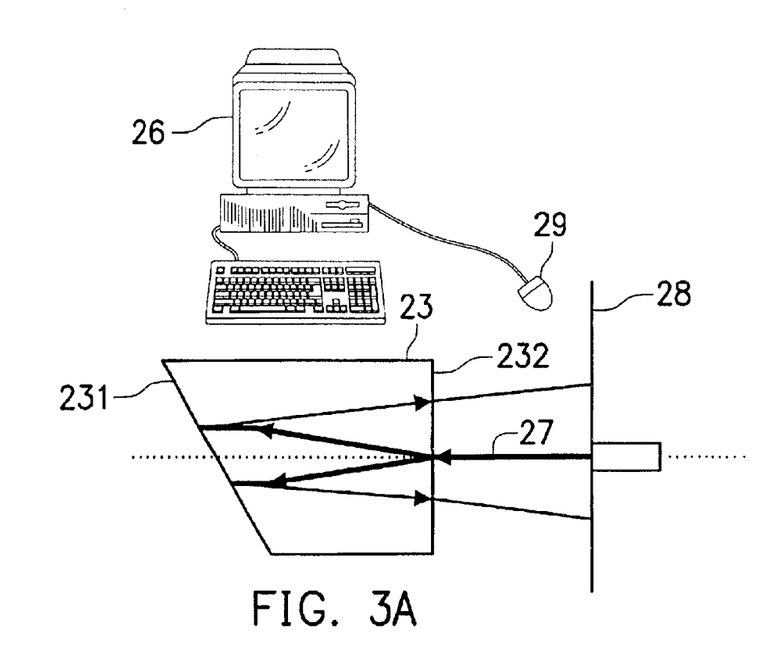
FIG. 3A shows a reflection of the laser beams in the slant surface of the GRIN Lens.
Figure 3B:
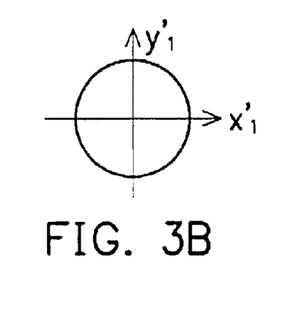
FIG. 3B shows the circular projection created on the slant surface of the GRIN Lens by the laser beams of FIG. 3A.
Figure 3C:
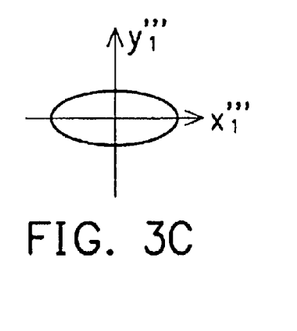
FIG. 3C shows the oval projection created on the vertical surface of the GRIN Lens by the laser beams of FIG. 3A.
Figure 3D:
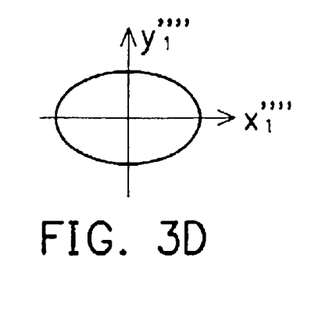
FIG. 3D shows the oval projection created on the screen by the laser beams of FIG. 3A.

To measure the angle of the slant surface of the ferrule, the invention uses a standard GRIN Lens. Referring to FIG. 2, the angle $\theta_1$ of the slant surface of the GRIN Lens 23 is known, as are its optical characteristics. The GRIN Lens 23 is inserted into one end of the tubular holder 15 and mounted using glue 17. Then, the tubular holder 15 is further fixed to a base (not shown). In addition, a key 25 having a fixed length is disposed abutting the slant surface 231 of the GRIN Lens 23 in the tubular holder 15. When the ferrule assembly 11 is inserted to the other end of the tubular holder 15, the key 25 separates the ferrule 111 by a fixed distance. To make the measurement, visible laser beams 27 are input into the output end of the GRIN Lens 23. Referring to FIG. 3, when the visible laser beams 27 encounter the slant surface 231 of the GRIN Lens 23, they generate a circular projection (as shown in FIG. 3B) on the slant surface 231 and then yield reflected beams. The reflected beams generate an oval projection (as shown in FIG. 3C) on the vertical surface 232 of the GRIN Lens 23. Finally, the reflected beams diffuse and project a first oval projection (as shown in FIG. 3D) on the screen 28. This first oval projection is taken by an image-retrieving device (such as a charge coupled device, CCD) 29 and transmitted to a personal computer 26 for further image processing.

Figure 4A:
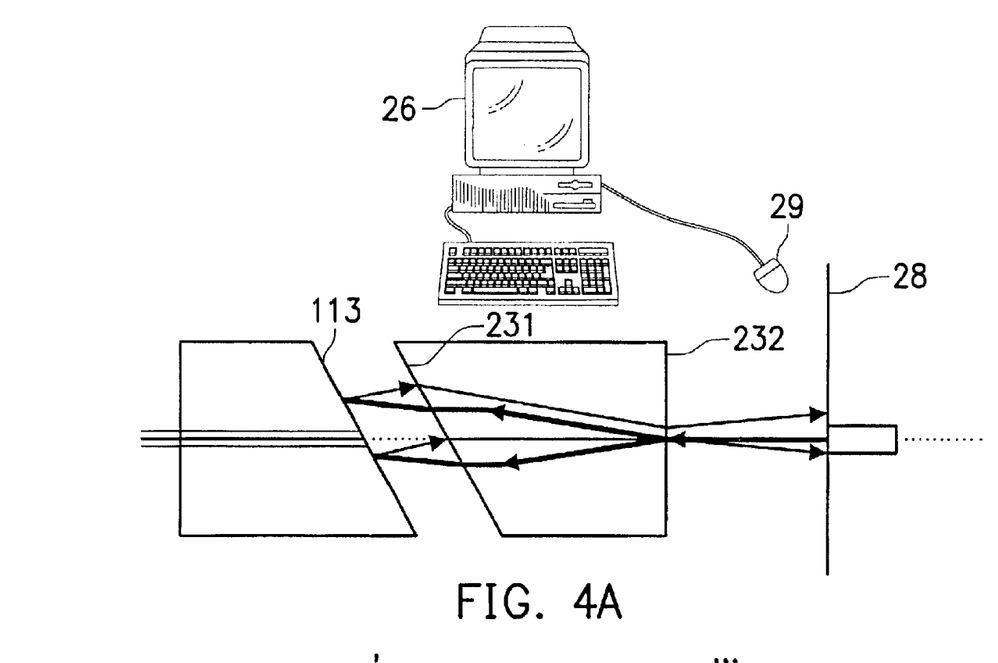
FIG. 4A shows reflection of the laser beams on the slant surface of the ferrule.
Figure 4B:
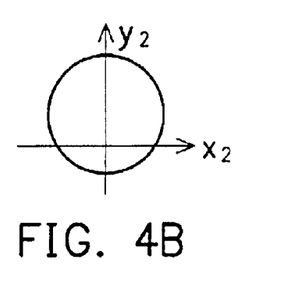
FIG. 4B shows the circular projection created on the slant surface of the ferrule by the laser beams of FIG. 4A.
Figure 4C:
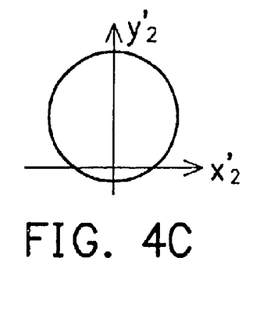
FIG. 4C shows the circular projection created on the slant surface of the GRIN Lens by the laser beams of FIG. 4A.
Figure 4D:
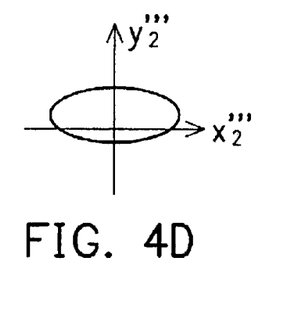
FIG. 4D shows the oval projection created on the vertical surface of the GRIN Lens by the laser beams of FIG. 4A.
Figure 4E:
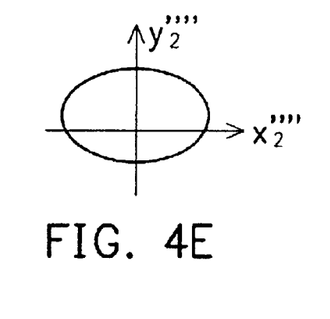
FIG. 4E shows the oval projection created on the screen by the laser beams of FIG. 4A.

A portion of the laser beams encountering the slant surface 231 of the GRIN Lens 23 penetrate therethrough, as shown in FIG. 4A. When the laser beams encounter the slant surface 113 of the ferrule, they generate a circular projection on the slant surface 113 (as shown in FIG. 4B). The beams are reflected off the slant surface 113. When the reflected beams penetrate the slant surface 231 of the GRIN Lens 23, a circular projection is also generated on the slant surface 231 (as shown in FIG. 4C). Furthermore, the reflected beams generate an oval projection on the vertical surface 232 of the GRIN Lens 23 (as shown in FIG. 4D). Finally, the reflected beams diffuse and project a second oval projection on the screen 28 (as shown in FIG. 4E). This second oval projection is taken by the image-retrieving device 29 and transmitted to the personal computer 26 for further image processing. Comparing the major length and the minor length of the first oval projection with those of the second oval projection, we can obtain a difference value between the angle $\theta_2$ of the slant surface of the ferrule being measured and the angle $\theta_1$ of the slant surface of the standard GRIN Lens, and thus acquire the angle $\theta_2$. A formula for calculating $\theta_2$ is described below.

Figure 5:
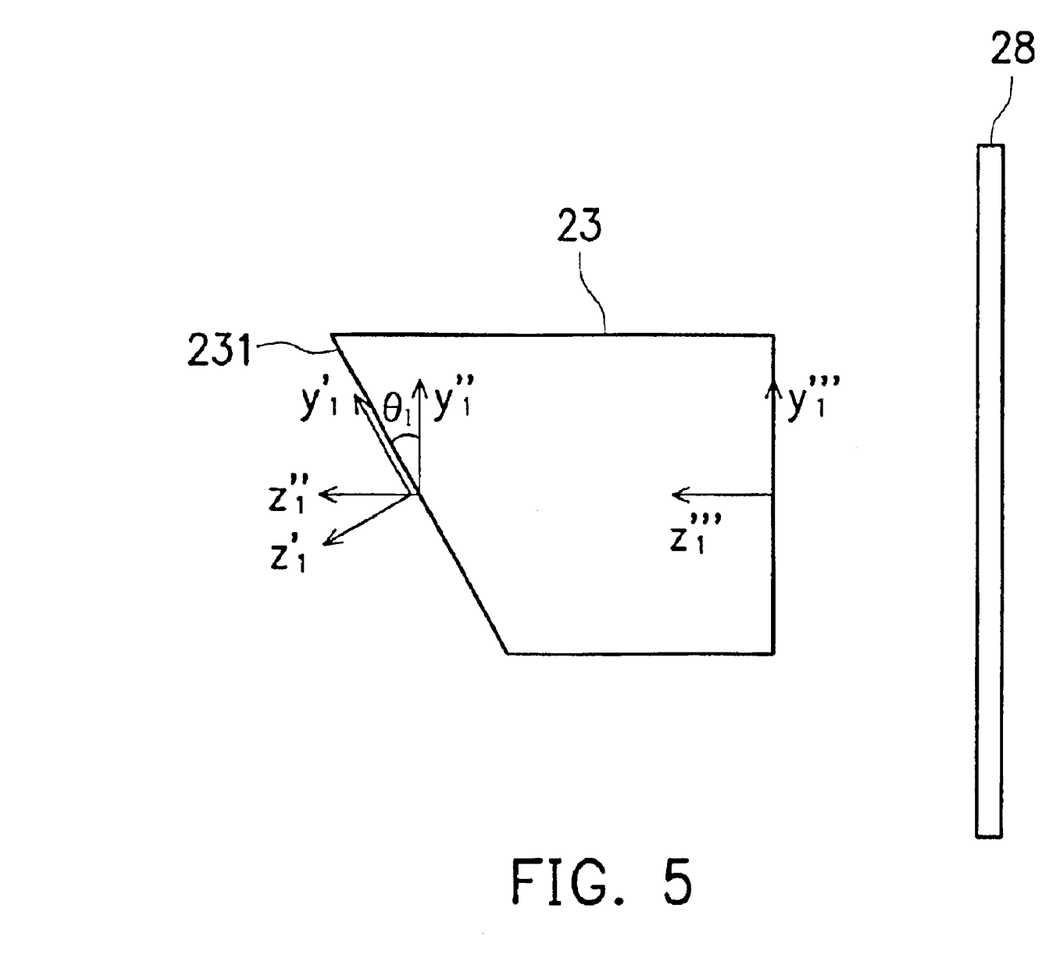
FIG. 5 shows a set of coordinates defined on the GRIN Lens.

The projection relation among the slant surface of the GRIN Lens, the slant surface of the ferrule and the screen surface can be understood in terms of mathematical coordinate conversion. It is assumed that the angle of the slant surface of the GRIN Lens is $\theta_1$ and the angle of the slant surface of the ferrule $\theta_2$. Visible light forms a circular projection on the slant surface 231 of the GRIN Lens, wherein the coordinate of the circular projection on the slant surface is $(x'_1, y'_1)$. Because the end surface 232 of the GRIN Lens and the screen 28 are vertical surfaces, the coordinate of the circular projection on the slant surface 231 is converted to a coordinate $(x''_1, y''_1)$ on the vertical surface before the reflected light penetrates the GRIN Lens 23. Referring to FIG. 5, the relation between the two coordinates is $$\begin{bmatrix} x''_1 \\ y''_1 \end{bmatrix} = \begin{bmatrix} 1 & 0 \\ 0 & \cos\theta_1 \end{bmatrix} \begin{bmatrix} x'_1 \\ y'_1 \end{bmatrix} \quad (1)$$

Assume $r''_1 = \sqrt{(x''_1)^2 + (y''_1)^2}$, and $\theta''_{1g}$ is the irradiation angle of the reflected laser beams on the vertical surface 232 of the GRIN Lens. The theoretic relation between the irradiation angle and the exit angle of the laser beams in the GRIN Lens is expressed with equation (2).

$$\begin{bmatrix} r'''_1 \\ \theta'''_{1g} \end{bmatrix} = \begin{bmatrix} \cos(Z\sqrt{A}) & \dfrac{\sin(Z\sqrt{A})}{N_0\sqrt{A}} \\ -N_0\sqrt{A}\sin(Z\sqrt{A}) & \cos(Z\sqrt{A}) \end{bmatrix} \begin{bmatrix} r''_1 \\ \theta''_{1g} \end{bmatrix} \quad (2)$$

In equation (2), $\sqrt{A}$ is a constant of the GRIN Lens, $\theta''_{1g}$ is the irradiation angle, $r''_1$ is the distance from the irradiation position to the center of the GRIN Lens, $r'''_1$ is the distance from the exit position to the center of the GRIN Lens, $\theta'''_{1g}$ is the exit angle, $N_o$ is the refractive index of the GRIN Lens, and Z is the mechanical length of the GRIN Lens.

The diffusion angle of the exiting laser beams can be obtained from the numerical aperture of the GRIN Lens. According to the diffusion angle, the distance between the screen and the end surface of the GRIN Lens, the coordinate of the oval projection on the GRIN Lens, and the dimensions of the oval projection on the screen can be obtained. It is noticed that the oval projection on the vertical surface of the GRIN Lens is proportional to that on the screen.

Similarly, the laser beams not reflected by the slant surface of the GRIN Lens irradiate onto the slant surface 113 of the ferrule according to the law of refraction. As shown in FIG. 4A, reflection also occurs on the slant surface 113, and a circular projection $(x_2, y_2)$ is created thereon. Then, the laser beams reflects onto the slant surface $(x'_2, y'_2)$ of the GRIN Lens. The projection on the slant surface 231 of the GRIN Lens is a coordinate conversion of the reflection of the circular projection on the slant surface 113 of the ferrule.

Figure 6:
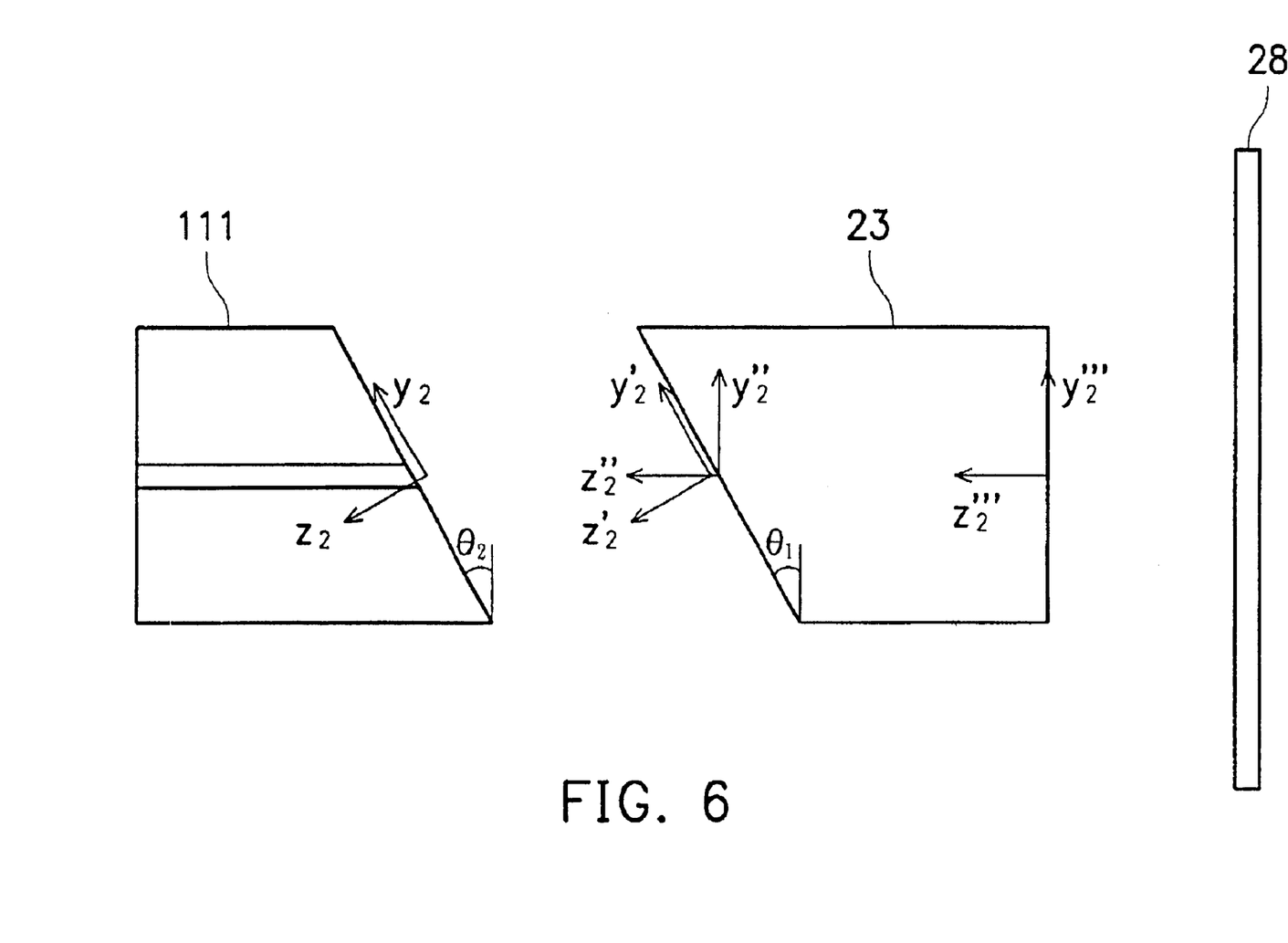
FIG. 6 shows another set of coordinates defined on the ferrule and the GRIN Lens.

Assume that the difference value between the angle $(\theta_2)$ of the slant surface of the ferrule and the angle $(\theta_1)$ of the slant surface of the GRIN Lens is expressed in $\Delta\theta=|\theta_1-\theta_2|$. Referring to FIG. 6, the equation of the coordinate conversion is $$\begin{bmatrix} x'_2 \\ y'_2 \end{bmatrix} = \begin{bmatrix} 1 & 0 \\ 0 & \cos\Delta\theta \end{bmatrix} \begin{bmatrix} x_2 \\ y_2 \end{bmatrix} \quad (3)$$

The coordinate $(x'_2, y'_2)$ of the circular projection on the GRIN Lens can be obtained on the basis of the law of reflection, the law of refraction and the distance between the ferrule and the GRIN Lens. Because the end surface of the GRIN Lens and the screen are planar surfaces, the circular projection on the slant surface is converted to a coordinate $(x''_2, y''_2)$ on the vertical surface before the reflected laser beams reach the GRIN Lens, as follows $$\begin{bmatrix} x''_2 \\ y''_2 \end{bmatrix} = \begin{bmatrix} 1 & 0 \\ 0 & \cos\theta_1 \end{bmatrix} \begin{bmatrix} x'_2 \\ y'_2 \end{bmatrix} \quad (4)$$

$$= \begin{bmatrix} 1 & 0 \\ 0 & \cos\theta_1 \end{bmatrix} \begin{bmatrix} 1 & 0 \\ 0 & \cos\Delta\theta \end{bmatrix} \begin{bmatrix} x_2 \\ y_2 \end{bmatrix}$$

Assume $r''_2 = \sqrt{(x''_2)^2 + (y''_2)^2}$, and $\theta''_{2g}$ is the irradiation angle of the reflected laser beams. Therefore, the equation describing angle of laser beams entering and leaving a GRIN Lens is expressed with $$\begin{bmatrix} r'''_2 \\ \theta'''_{2g} \end{bmatrix} = \begin{bmatrix} \cos(Z\sqrt{A}) & \dfrac{\sin(Z\sqrt{A})}{N_0\sqrt{A}} \\ -N_0\sqrt{A}\sin(Z\sqrt{A}) & \cos(Z\sqrt{A}) \end{bmatrix} \begin{bmatrix} r''_2 \\ \theta''_{2g} \end{bmatrix} \quad (5)$$

In the equation (5), $\sqrt{A}$ is a constant of the GRIN Lens, $\theta''_{2g}$ is the irradiation angle of the laser beams, $r''_2$ is the distance from the irradiation position to the center of the GRIN Lens, $r'''_2$ is the distance from the exit position to the center of the GRIN Lens, $\theta'''_{2g}$ is the exit angle of the laser beams, $N_o$ is the refractive index of the GRIN Lens, and Z is the mechanical length of the GRIN Lens.

Because all terms in equations (1) and (2) are known or can be determined, it is possible to use the image-retrieving device 29 to read the dimensions of the first oval projection on the screen so that we can obtain a proportional value as compared to the dimensions of equation (2). In equation (4), though $\Delta\theta=|\theta_1-\theta_2|$ is unknown (because of the unknown $\theta_2$), the coordinate dimensions of the exiting laser beams on the slant surface of the GRIN Lens and the matrix of the optical characteristic of the GRIN Lens in equation (5) are known. As a result, the angle $\theta_2$ of the slant surface of the ferrule can be obtained by way of using the image-retrieving device 29 to read the dimensions of the second oval projection on the screen to determine $\Delta\theta$.

The following steps are performed in the calculation of $\theta_2$ according to the present invention:

(Step 1) Determine $x''_1$ and $y''_1$ from equation (1).
(Step 2) Determine $r''_1$ and $\theta''_{1g}$ from $x''_1$ and $y''_1$.
(Step 3) According to equation (2), determine $r'''_1$ and $\theta'''_{1g}$ which represent the dimensions of the first oval projection on the vertical surface of the GRIN Lens.
(Step 4) Divide the dimensions of the first oval projection on the screen obtained by the image-retrieving device by the dimensions in equation (2) so as to acquire a proportional value.

(Step 5) Divide the dimensions of the second oval projection on the screen obtained by the image-retrieving device by the proportional value so as to acquire $r'''_2$ and $\theta'''_{2g}$ of the second oval projection on the vertical surface of the GRIN Lens.

(Step 6) According to equation (5), determine $r''_2$ and $\theta''_{2g}$.

(Step 7) Determine $x''_2$ and $y''_2$ from $r''_2$ and $\theta''_{2g}$.

(Step 8) According to equation (4), determine $\Delta\theta$.

(Step 9) According to $\Delta\theta=|\theta_1-\theta_2|$, determine $\theta_2$.

From the aforementioned calculation steps and formulas, we can determine the angle $\theta_2$ of the slant surface of the ferrule. In addition, the method described in the invention can also determine the angle of the slant surface for other optical components.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for measuring angle of slant surface of an optical component, comprising the steps of:
   (a) Providing a standard GRIN Lens having a slant surface and a vertical surface, the standard GRIN Lens having a known specification;
   (b) Positioning the slant surface of the optical component a fixed distance from the standard GRIN Lens and facing exactly toward the slant surface of the standard GRIN Lens;
   (c) Irradiating laser beams into the vertical surface of the standard GRIN Lens to generate a first oval projection by reflection off the slant surface of the standard GRIN Lens and a second oval projection by reflection off the slant surface of the optical component;
   (d) Determining the angle of the slant surface of the optical component on the basis of the specification of the standard GRIN Lens and the dimensions of the first and second oval projections.

2. The method as set forth in claim 1, wherein the first and second oval projections in step (c) are generated on a screen.

3. The method as set forth in claim 2, wherein the step (d) includes the sub-steps of:
   (d1) Determining $x''_1$ and $y''_1$ from equation (1), $$\begin{bmatrix} x''_1 \\ y''_1 \end{bmatrix} = \begin{bmatrix} 1 & 0 \\ 0 & \cos\theta_1 \end{bmatrix} \begin{bmatrix} x'_1 \\ y'_1 \end{bmatrix} \quad (1)$$

wherein $x'_1$, $y'_1$ is a set of coordinates on the slant surface of the standard GRIN Lens, $\theta_1$ is the angle of the slant surface of the standard GRIN Lens, and $x''_1$, $y''_1$ is a set of coordinates on the vertical surface of the standard GRIN Lens, which are converted from the coordinates on the slant surface of the standard GRIN Lens;

(d2) Determining $r''_1$ and $\theta''_{1g}$ from $x''_1$ and $y''_1$, wherein $r''_1$ is the distance between the irradiation position of the laser beams and the center of the standard GRIN Lens, and $\theta''_{1g}$ is the irradiation angle of the reflected laser beams on the vertical surface of the standard GRIN Lens;

(d3) Determining the dimensions $r'''_1$ and $\theta'''_{1g}$ of the first oval projection on the vertical surface of the standard GRIN Lens according to equation (2), $$\begin{bmatrix} r'''_1 \\ \theta'''_{1g} \end{bmatrix} = \begin{bmatrix} \cos(Z\sqrt{A}) & \frac{\sin(Z\sqrt{A})}{N_0\sqrt{A}} \\ -N_0\sqrt{A}\sin(Z\sqrt{A}) & \cos(Z\sqrt{A}) \end{bmatrix} \begin{bmatrix} r''_1 \\ \theta''_{1g} \end{bmatrix} \quad (2)$$

wherein $\sqrt{A}$ is a constant of the standard GRIN Lens, $\theta''_{1g}$ is the irradiation angle of the laser beams, $r''_1$ is the distance between the irradiation position of the laser beams and the center of the standard GRIN Lens, $\theta'''_{1g}$ is the exit angle of the laser beams, $N_o$ is the refractive index of the standard GRIN Lens, and Z is the mechanical length of the standard GRIN Lens;

(d4) Dividing the dimensions of the first oval projection on the screen by the dimensions of the first oval projection on the vertical surface of the standard GRIN Lens in equation (2) so as to acquire a proportional value;

(d5) Dividing the dimensions of the second oval projection on the screen by the proportional value so as to acquire $r'''_2$ and $\theta'''_{2g}$ of the second oval projection on the vertical surface of the standard GRIN Lens;

(d6) Determining $r''_2$ and $\theta''_{2g}$ according to equation (3), $$\begin{bmatrix} r'''_2 \\ \theta'''_{2g} \end{bmatrix} = \begin{bmatrix} \cos(Z\sqrt{A}) & \frac{\sin(Z\sqrt{A})}{N_0\sqrt{A}} \\ -N_0\sqrt{A}\sin(Z\sqrt{A}) & \cos(Z\sqrt{A}) \end{bmatrix} \begin{bmatrix} r''_2 \\ \theta''_{2g} \end{bmatrix} \quad (3)$$

wherein $\theta''_{2g}$ is the irradiation angle of the laser beams, $r''_2$ is the distance between the irradiation position of the laser beams and the center of the standard GRIN Lens, $r'''_2$ is the distance between the exit position of the laser beams and the center of the standard GRIN Lens, and $\theta'''_{2g}$ is the exit angle of the laser beams;

(d7) Determining $x''_2$ and $y''_2$ from $r''_2$ and $\theta''_{2g}$, wherein $x''_2$ and $y''_2$ is a set of coordinates converted from the slant surface to the vertical surface of the standard GRIN Lens;

(d8) Determining $\Delta\theta$ from equation (4), $$\begin{bmatrix} x''_2 \\ y''_2 \end{bmatrix} = \begin{bmatrix} 1 & 0 \\ 0 & \cos\theta_1 \end{bmatrix} \begin{bmatrix} 1 & 0 \\ 0 & \cos\Delta\theta \end{bmatrix} \begin{bmatrix} x_2 \\ y_2 \end{bmatrix} \quad (4)$$

wherein $x_2$ and $y_2$ is a set of coordinates on the slant surface of the optical component, and $\Delta\theta=|\theta_1-\theta_2|$;

(d9) Determining $\theta_2$ according to $\Delta\theta=|\theta_1-\theta_2|$, wherein $\theta_2$ is the angle of the slant surface of the optical component.

4. A device for measuring angle of slant surface of an optical component, comprising:
   a standard GRIN Lens, having a slant surface and a vertical surface, the slant surface of the standard GRIN Lens facing exactly toward the slant surface of the optical component, and the standard GRIN Lens being spaced from the optical component by a fixed distance;

a screen;

a source of laser beams for inputting laser beams to the vertical surface of the standard GRIN Lens and creating a reflection off the slant surface of the standard GRIN Lens and the slant surface of the optical component so as to generate a first oval projection and a second oval projection on the screen;

an image-retrieving device, capturing images of the first oval projection and the second oval projection, and outputting a corresponding signal;

a processor, receiving the corresponding signal and determining the angle of the slant surface of the optical component.

5. The device as set forth in claim 4, further comprising a key disposed between the optical component and the standard GRIN Lens so as to maintain a fixed distance between the optical component and the standard GRIN Lens.

* * * * *